(12) United States Patent
Knijnik et al.

(10) Patent No.: US 11,315,145 B1
(45) Date of Patent: Apr. 26, 2022

(54) SYSTEMS AND METHODS FOR INCREASING DIGITAL MARKETING CAMPAIGN EFFICIENCY

(71) Applicants: Daniel Knijnik, Old Greenwich, CT (US); Anibal Knijnik, Porto Alegre (BR); Eduardo Knijnik, Riverside, CT (US)

(72) Inventors: Daniel Knijnik, Old Greenwich, CT (US); Anibal Knijnik, Porto Alegre (BR); Eduardo Knijnik, Riverside, CT (US)

(73) Assignee: Quartile Digital, Inc., New York, NY (US)

( * ) Notice: Subject to any disclaimer, the term of this patent is extended or adjusted under 35 U.S.C. 154(b) by 50 days.

(21) Appl. No.: 16/281,420

(22) Filed: Feb. 21, 2019

Related U.S. Application Data

(60) Provisional application No. 62/633,449, filed on Feb. 21, 2018.

(51) Int. Cl.
  *G06Q 30/02* (2012.01)
  *G06N 20/00* (2019.01)

(52) U.S. Cl.
  CPC ......... *G06Q 30/0249* (2013.01); *G06N 20/00* (2019.01); *G06Q 30/0201* (2013.01); *G06Q 30/0202* (2013.01)

(58) Field of Classification Search
  CPC .......... G06Q 30/0249; G06Q 30/0202; G06Q 30/0201; G06N 20/00
  See application file for complete search history.

(56) References Cited

U.S. PATENT DOCUMENTS

| | | | | |
|---|---|---|---|---|
| 8,386,398 | B1 * | 2/2013 | Hickman | ............... G06Q 30/02 705/400 |
| 10,915,929 | B1 * | 2/2021 | Huang | ............. H04N 21/47211 |
| 2007/0027754 | A1 | 2/2007 | Collins et al. | |
| 2011/0246267 | A1 * | 10/2011 | Williams | ............... G06Q 30/02 705/14.4 |
| 2011/0251875 | A1 * | 10/2011 | Cosman | ............. G06Q 30/0273 705/7.31 |
| 2013/0018722 | A1 | 1/2013 | Libby | |
| 2013/0036013 | A1 | 2/2013 | James et al. | |
| 2013/0132437 | A1 * | 5/2013 | Park | ........................ G06F 16/00 707/780 |
| 2013/0138503 | A1 * | 5/2013 | Brown | ............... G06Q 30/0203 705/14.45 |
| 2013/0282444 | A1 * | 10/2013 | Karlsson | ............ G06Q 30/0243 705/7.37 |
| 2014/0081715 | A1 * | 3/2014 | Govindaraman | .......................... G06Q 10/06398 705/7.42 |
| 2015/0066628 | A1 | 3/2015 | Ghosh et al. | |
| 2017/0213235 | A1 * | 7/2017 | Lautenberg | ........ G06Q 30/0255 |
| 2018/0253753 | A1 * | 9/2018 | Chung | ................. G06Q 20/386 |

FOREIGN PATENT DOCUMENTS

| | | |
|---|---|---|
| WO | 2016007382 | 1/2016 |

OTHER PUBLICATIONS

Office Action dated Jul. 27, 2020 in connection with U.S. Appl. No. 16/281,443.
Office Action dated Jan. 28, 2021 in connection with U.S. Appl. No. 16/281,443.
Office Action dated Jun. 5, 2020 in connection with U.S. Appl. No. 16/249,465.
Gupta et al., Allocating Marketing Resouices, Jan. 28, 2008.

\* cited by examiner

*Primary Examiner* — Mario C. Iosif
(74) *Attorney, Agent, or Firm* — Pryor Cashman LLP

(57) ABSTRACT

A method and associated system of managing advertising spending in an advertising campaign for an online marketplace seller, including, under control of one or more processors configured with executable instructions, defining a sales goal; setting a daily advertising budget and a bid value for an advertising campaign of the product; executing the advertising campaign; automatically collecting sales data relating to the product on the online marketplace; executing a machine learning component of an adaptive machine learning platform to generate a machine learning component output, at least in part based on the sales data; generating, based at least in part on the machine learning component output of the machine learning component, one or more sales milestones for the product on the online marketplace; comparing the sales data to the one or more sales milestones; and adjusting the daily advertising budget or the bid value to meet the sales goal.

18 Claims, No Drawings

SYSTEMS AND METHODS FOR INCREASING DIGITAL MARKETING CAMPAIGN EFFICIENCY

CROSS-REFERENCE TO RELATED APPLICATIONS

The present application claims priority to U.S. Provisional Patent Application No. 62/633,449, filed Feb. 21, 2018, the disclosures and teachings of which are incorporated herein by reference.

TECHNICAL FIELD

The present invention relates to systems and methods, used in the online-based commercial environment, for managing and optimizing digital marketing and advertising campaigns through automatic termination upon completion of one or more predefined goals or limits.

BACKGROUND OF THE INVENTION

Digital marketing plays an important role in e-commerce (online-based commerce) activities, as it can serve to increase the speed and volume of online sales by attracting customers to a product (UPC) being sold in Internet marketplaces or on websites. At the same time, digital marketing represents a key cost to the seller, negatively affecting the seller's margins.

Digital marketing and advertising campaigns (ADC) requires, at a minimum, a defined daily advertising budget (DAB) and a bid amount, which is the value that a seller accepts to pay for each click relating to the relevant UPC.

As long as the DAB is not completely exhausted, the Internet marketplace continues to make impressions of the UPC, charging per click from each potential customer. The value relating to the charge for every click is called the Cost per Click (CPC). The CPC cannot exceed the bid value. These charges continue while there is still an available balance in the DAB. The CPC typically varies throughout a given day and week, such that a click can cost different amounts during different periods.

The present invention is directed to an automated method and system for improving efficiency in advertising spending and increasing overall margins by ending, or lowering the bid in, advertising campaigns (paid sales) when a forecasted value for total sales (paid sales plus organic sales) reaches a predefined goal. Improving efficiency is understood to mean having a smaller unitary advertisement expenditure per sale. By efficiently ending the ADC, the advertising process becomes more efficient, both by spending less money during expensive time periods and by raising the average sales price as a result of increasing the UPC price when defined requirements, such as a daily UPC quota or a top limit due to inventory constraints, are met.

The present invention is directed to a method and system for enhancing advertising campaign performance by termination upon completion of certain predefined goals, or if forecasted to be met by the end of the period with an acceptable level of confidence. The forecasting may be performed by extensive use of machine learning and artificial intelligence software. The same approach and tools may be used to forecast organic sales.

SUMMARY OF THE INVENTION

In general, in one aspect, the invention features a method of managing advertising spending in an advertising campaign for an online marketplace seller, including, under control of one or more processors configured with executable instructions, defining a sales goal relating to a number of sales of a product on an online marketplace; setting a daily advertising budget and a bid value for an advertising campaign of the product for the online marketplace seller on the online marketplace; executing the advertising campaign of the product on the online marketplace; automatically collecting sales data relating to the product on the online marketplace; executing a machine learning component of an adaptive machine learning platform to generate a machine learning component output, at least in part based on the sales data; generating, based at least in part on the machine learning component output of the machine learning component, one or more sales milestones for the product on the online marketplace; comparing the sales data to the one or more sales milestones; and adjusting, based on the comparison of the sales data to the one or more sales milestones, the daily advertising budget or the bid value to meet the sales goal.

Implementations of the invention may include one or more of the following features. The sales goal may be based at least in part on one or more inventory constraints. The sales data may be collected from one or more sales channels. The sales data may be repeatedly collected at a set time interval. The method may further include automatically collecting additional marketplace data relating to the product on the online marketplace; executing a second machine learning component of an adaptive machine learning platform to generate a second machine learning component output, at least in part based on the additional marketplace data; generating, based at least in part on the second machine learning component output of the second machine learning component, a future organic sales forecast for the product; and adjusting, based at least in part on the future organic sales forecast, one or more aspects of the advertising campaign.

The additional marketplace data may include one or more of a marketplace ranking of the online marketplace seller for the product, a plurality of customer reviews of the online marketplace seller for the product, a rating of the online marketplace seller for the product based on the customer reviews, a number of total sales, a number of organic sales, a number of advertisement-generated sales, a conversion rate, a number of advertisement clicks relating to the advertising campaign, and a number of advertisement impressions relating to the advertising campaign. The advertising campaign may be an automated advertising campaign or a keyword advertising campaign. The adjusting may be a cessation of the advertising campaign or a modification of the bid value. The method may further include modifying a sales price of the product on the online marketplace. The method may further include executing a third machine learning component of an adaptive machine learning platform to generate a third machine learning component output, at least in part based on the sales data; generating, based at least in part on the third machine learning component output of the third machine learning component, a sales price adjustment for the product; and adjusting, based at least in part on the sales price adjustment and a status of the sales goal, the sales price of the product on the online marketplace.

In general, in another aspect, the invention features a system configured to manage advertising spending in an advertising campaign for an online marketplace seller, including one or more processors, one or more computer-readable media, and one or more modules maintained on the one or more computer-readable media that, when executed by the one or more processors, cause the one or more processors to perform operations including: defining a sales goal relating to a number of sales of a product on an online marketplace; setting a daily advertising budget and a bid value for an advertising campaign of the product for the online marketplace seller on the online marketplace; executing the advertising campaign of the product on the online marketplace; automatically collecting sales data relating to the product on the online marketplace; executing a machine learning component of an adaptive machine learning platform to generate a machine learning component output, at least in part based on the sales data; generating, based at least in part on the machine learning component output of the machine learning component, one or more sales milestones for the product on the online marketplace; comparing the sales data to the one or more sales milestones; and adjusting, based on the comparison of the sales data to the one or more sales milestones, the daily advertising budget or the bid value to meet the sales goal.

Implementations of the invention may include one or more of the following features. The sales goal may be based at least in part on one or more inventory constraints. The sales data may be collected from one or more sales channels. The sales data may be repeatedly collected at a set time interval. The system may further include additional operations of automatically collecting additional marketplace data relating to the product on the online marketplace; executing a second machine learning component of an adaptive machine learning platform to generate a second machine learning component output, at least in part based on the additional marketplace data; generating, based at least in part on the second machine learning component output of the second machine learning component, a future organic sales forecast for the product; and adjusting, based at least in part on the future organic sales forecast, one or more aspects of the advertising campaign.

The additional marketplace data may include one or more of a marketplace ranking of the online marketplace seller for the product, a plurality of customer reviews of the online marketplace seller for the product, a rating of the online marketplace seller for the product based on the customer reviews, a number of total sales, a number of organic sales, a number of advertisement-generated sales, a conversion rate, a number of advertisement clicks relating to the advertising campaign, and a number of advertisement impressions relating to the advertising campaign. The advertising campaign may be an automated advertising campaign or a keyword advertising campaign. The adjusting may be a cessation of the advertising campaign or a modification of the bid value. The system may further include an additional operation of modifying a sales price of the product on the online marketplace. The system may further include additional operations of executing a third machine learning component of an adaptive machine learning platform to generate a third machine learning component output, at least in part based on the sales data; generating, based at least in part on the third machine learning component output of the third machine learning component, a sales price adjustment for the product; and adjusting, based at least in part on the sales price adjustment and a status of the sales goal, the sales price of the product on the online marketplace.

DETAILED DESCRIPTION OF THE INVENTION

The present invention is directed to expediting the termination of advertising campaigns for UPCs in e-commerce to guarantee a more efficient use of advertising spending. The decision to end a digital marketing action through an ADC is automatically triggered either by the production of an acceptable forecast of the total sales, with the aid of machine learning and artificial intelligence resources, or by reaching or forecasting a predefined inventory limitation or constraint.

Apart from information relating to any previous ADCs, if available, the only external data needed to begin use of the present invention are the DAB, the bid, and, if desired, inventory constraints. This data should be provided by the seller before launching an advertising campaign.

If there is no information on any previous ADCs, the present invention may proceed, for a certain duration, to acquire such records from a campaign. In one embodiment of the present invention, the certain duration for acquiring this initial data is one week.

The present invention, directed to managing and optimizing digital marketing and ADCs by automatic termination, or lowering of the bids, upon completion or forecasting completion of a predefined goal, may include one or more of the following steps. These steps are the preferred steps in one embodiment of the present invention.
1. Determine the time interval for the method;
2. Define the inventory constraints, if desired;
3. Define DAB and the bid for ADC;
4. Connect the system to all sales channels;
5. Run the ADC;
6. Gather timed data from sales channels;
7. Use machine learning and artificial intelligence to create and update hurdles and milestones;
8. Compare retrieved data to hurdles, milestones, inventory constraints, and goals;
9. Decide whether to change the ADC parameters;
10. Based on the above comparison and decision relating to changing the ADC parameters, automatically update or zero values for the bid or ACoS target; and
11. Increase, maintain, or decrease the sales price according to a predefined set of rules or through acceptance of machine learning software suggestions.

These individual steps need not be included in every use of the present invention, and may be grouped, merged, split, ordained, or arranged in different ways. The steps, variables, and parameters involved in the calculations for optimizing a marketplace ADC for a UPC will be described in sequence.

The first step is to choose the period of time after which analysis of the advertising disbursal will be completed and define the goal for the number of sales. In one embodiment of the present invention, this period is one day.

In the sequence, the system must be connected to all sales channels to assure knowledge in real time of the volume and speed of the sales data and of the advertising spending. In one embodiment of the present invention, data retrieval from sales channels (Internet marketplaces and/or websites) is performed every hour. This online access to the data is fundamental for efficiently managing an ADC.

If desired, additional inventory constraints can be set by the seller in order to avoid situations of selling out of a UPC or facing delays in shipping sold goods. This information, if available and provided, will assist in the decision relating to any sales price increase or decrease.

Data gathering should be carried out considering all sales channels in aggregate. This rationale can be applied to any set or subset of sales channels, including the scenario of having a single sales channel.

If the seller determines a daily quota of UPC to sell (a daily sales goal, or DSG) such as to be neither sold out nor overstocked, placing a limit to the advertising expenditure is more complicated than it may appear. The total sales volume (number of sales, or NOS) is the sum of the advertised sales (paid click originated sales) and the organic sales, which are those sales unconnected to the ADC. In other words, organic sales are sales whose origins were not through a paid click. These sales are not directly manageable through an ADC, as they occur as a result of a click not generated from an ADC and thus are extremely difficult for the seller to control.

One way to improve and optimize an ADC is to forecast organic sales based on an algorithm that considers the data retrieved from the marketplace to create a dedicated database. In one embodiment of the present invention, the additional data retrieved from the marketplace to be used in forecasting organic sales are the number of organic sales, reviews, ratings, rankings, the total number of sales, advertisement-generated sales, conversion rate, the number of clicks, and the number of impressions. Not all of these retrieved values are necessary but are retrieved for eventually improving precision of the forecasting process.

The principal information for forecasting future organic sales is the data on previous organic sales, both in units and in percentage points. The time series for the daily evolution of organic sales is key in this forecasting.

If there is no previous data relating to the required variables, the system begins building its own database on a relevant UPC by retrieving data from the ADCs run with the present invention. Although not necessarily ideal, this approach provides a good starting point for correctly forecasting organic sales such that forecasting accuracy increases with each new ADC.

The organic sales forecast is performed through extensive use of artificial intelligence and machine learning software and is a large source of savings on advertising expenditure, as it provides trustworthy information for advertised sales (paid sales). Advertised sales are represented as the difference between the sales goal and organic sales. When fewer advertised sales are needed to achieve the sales goal, less money could be spent on an advertising campaign, thereby decreasing the unitary cost of sale.

By forecasting the organic sales (ORS) of a relevant UPC, it is possible to stop or modify the ADC, by adjusting the bids, according to the following equation for the required number of advertised sales (NNS): NNS=DSG−ORS.

The next step is to define one or more hurdles that act as a beacon, triggering actions to manage the ADC. These definitions of hurdles and/or milestones are automated and continuously learned/updated from the database of previous ADCs through extensive use of machine learning and artificial intelligence. For instance, if the period is set to one day, one of the hurdles can be determined by the machine learning software to be 70% of daily sales and another one can be 85% of the daily sales. These hurdles are used in conjunction with the machine learning tools, such that the system may automatically determine that the total sales should reach, for example, 70% of the DSG by 5:00 PM. If the total sales reached 85% of DSG by 2:00 PM, it is likely that the DSG will be achieved by the end of the day, and thus it is possible and, in fact, advisable to terminate or lower the bids for certain expensive ADCs. These actions can be automated and performed by the system of the present invention with no human intervention.

This variation of the bid value can be defined in terms of both the ACoStarget for the UPC only and for the seller as a whole, also known as ACoSoverall. Consideration of the ACoSoverall is an advantageous way to distribute the acceptable advertising spending among all the UPCs sold by the company, making it easier to plan and evaluate advertising campaigns.

When beginning to use the system for a relevant UPC, while there is no sufficient volume of data to learn the behavior of certain keywords during the campaigns, all related ADC campaigns are stopped once the DSG is achieved.

As use of this process evolves, more data is gathered, and the model learns to better forecast these decisions, making it possible to prematurely stop or lower bids automatically in less efficient campaigns, saving on the advertising budget while still guaranteeing that the sales goals will be reached.

This action can be undertaken with respect to both automatic advertising campaigns (ATM) and keyword advertising campaigns. It is important to note that in ATM, the marketplace search engine chooses or suggests the words to show to potential customers, charging the seller for every click made by a potential customer.

Upon completion of one or more limits, hurdles, or goals of a relevant UPC, the system may turn off all campaigns relating to the UPC. If desired, after automatically determining that the campaigns on the UPC be turned off, the system can be set to automatically raise prices according to an established set of rules (either defined by the seller, or suggested by the system through the application of machine learning and artificial intelligence analysis on the database), in order to raise seller margins for the day, as the daily goals have already been met. In one embodiment of the present invention, when the NOS=1.05×DSG, the system raises the prices by 7.5%. These percentages may be automatically and arbitratrily defined and/or changed by the seller whenever and however desired. Alternatively, machine learning tools may be used to suggest or even automate when, how long, and how much to increase the sales price.

The inventory-related limits or constraints can be set manually or be automatically generated by the inventory management software of the seller.

As the system is connected online with all selling channels, every change in the bid or in the sales price will be active in near real time. Every time a new set of data is gathered from the marketplace, all of the calculations, analysis, checks, and verifications are performed again to ensure an improvement in the accuracy of the process.

The system is capable of automatically changing the bid value according a predefined set of rules or machine learning analysis to consider the variation of the CPC during defined intervals of a certain time period (e.g., hours, days, weeks, etc.).

The present invention improves efficiency in advertising spending of the digital marketing actions and increases overall margins in two ways: (1) as a result of there being less spending at the most expensive time periods (i.e., times having a higher CPC or lower Conversion Rates); and (2) as a result of increasing the daily average sale price by selling one or more units at a higher price.

Besides saving on the advertising spending, use of the present invention enhances the stability of the whole system by assuring that there will be no extreme inventory situations, as the limitation of advertising and sales volume by inventory or sales speed constraints helps to decrease required working capital and diminish the stress over the supply chain.

Typically, digital marketing platforms operate on a daily budget basis. There is a probability that a marketplace's algorithms will try to increase the number of impressions by the end of a billable period. This end-of-period overexposure of the UPC does not always lead to a proportional increase in advertised sales, making this expenditure less efficient. To overcome this potential situation, the present invention can be automatically set to turn off less efficient ADCs upon completion of certain predefined hurdles, goals, and/or limits relating to the UPC, including ACoStarget and ACoStargetoverall. ACoStarget is the desired maximum value of the Advertising Cost of Sales, defined by the seller for a given UPC, and ACoStargetoverall is the ACoStarget for the company as a whole. This action of turning off ADCs or lowering their bids or their daily budgets saves money on digital marketing expenditures without significant compromise to the sales goals while also lowering the advertising cost of sales (ACoS) of the relevant UPC or for the company as a whole.

The actions described herein can be initiated in an automated form by the system based on the analysis of the effective or forecasted sales and advertising goals.

The embodiments and examples above are illustrative, and many variations can be introduced to them without departing from the spirit and scope of the disclosure or from the scope of the invention. For example, elements and/or features of different illustrative and exemplary embodiments herein may be combined with each other and/or substituted with each other within the scope of this disclosure.

What is claimed is:

1. A method for improving the effectiveness of an adaptive machine learning platform in forecasting sales to determine whether a sales goal of an online marketplace seller is attainable, thereby discontinuing or modifying an advertising campaign generated by the online marketplace seller, the method performed by an application including one or more programs of instruction embodied in a non-transitory computer readable medium and executable by a processor to configure the application, comprising:
    defining a sales goal relating to a number of sales of a product on an online marketplace;
    setting a time period having a predetermined start and end;
    executing one or more advertising campaigns on an online marketplace in connection with the product, wherein one or more bid values are associated with the one or more advertising campaigns;
    generating an organic sales forecast of the product by executing a first machine learning component of the adaptive machine learning platform that is configured to generate the organic sales forecast via the input of organic sales data automatically retrieved from the online marketplace in connection with the product into the adaptive machine learning platform, the organic sales forecast being a forecast of total organic sales of the product before the end of the time period;
    generating one or more sales milestones for the product by executing a second machine learning component of the adaptive machine learning platform that is configured to generate the one or more sales milestones via input of sales data automatically retrieved from the online marketplace in connection with the product into the adaptive machine learning platform, each of the one or more sales milestones designating a total sales threshold and a specific time within the time period, wherein a sales milestone is achieved when total sales of the product reach the total sales threshold at the specific time; and
    determining automatically whether to discontinue one or more of the advertising campaigns or modify one or more of the advertising campaigns by decreasing the corresponding one or more bid values, while allowing the sales goal to be reached, the determination being based on at least one of the organic sales forecast or the sales milestones being achieved.

2. The method of claim 1, wherein the sales goal is based at least in part on one or more inventory constraints.

3. The method of claim 1, wherein the sales data is collected from one or more sales channels.

4. The method of claim 1, wherein the sales data is repeatedly collected at a set time interval.

5. The method of claim 1, wherein the advertising campaign is an automated advertising campaign or a keyword advertising campaign.

6. The method of claim 1, further comprising modifying a sales price of the product on the online marketplace.

7. The method of claim 6, further comprising:
    executing a third machine learning component of an adaptive machine learning platform to generate a third machine learning component output, at least in part based on the sales data;
    generating, based at least in part on the third machine learning component output of the third machine learning component, a sales price adjustment for the product; and
    adjusting, based at least in part on the sales price adjustment and a status of the sales goal, the sales price of the product on the online marketplace.

8. The method of claim 1, wherein the adaptive machine learning platform is additionally inputted with additional marketplace data automatically retrieved from the online marketplace in connection with the product to generate the organic sales forecast.

9. The method of claim 8, wherein the additional marketplace data includes one or more of a marketplace ranking of the online marketplace seller for the product, a plurality of customer reviews of the online marketplace seller for the product, a rating of the online marketplace seller for the product based on the customer reviews, a number of total sales, a number of organic sales, a number of advertisement-generated sales, a conversion rate, a number of advertisement clicks relating to the advertising campaign, and a number of advertisement impressions relating to the advertising campaign.

10. A system for improving the effectiveness of an adaptive machine learning platform in forecasting sales to determine whether a sales goal of an online marketplace seller is attainable, thereby discontinuing or modifying an advertising campaign generated by the online marketplace seller, the system comprising:
    one or more processors;
    one or more computer-readable media; and
    one or more modules maintained on the one or more computer-readable media that, when executed by the one or more processors, cause the one or more processors to perform operations including:
        defining a sales goal relating to a number of sales of a product on an online marketplace;
        setting a time period having a predetermined start and end;
        executing one or more advertising campaigns on an online marketplace in connection with the product, wherein one or more bid values are associated with the one or more advertising campaigns;
        generating an organic sales forecast of the product by executing a first machine learning component of an adaptive machine learning platform that is configured to generate the organic sales forecast via input of organic sales data automatically retrieved from the online marketplace in connection with the product into the adaptive machine learning platform, the organic sales forecast being a forecast of total organic sales of the product before the end of the time period;

generating one or more sales milestones for the product by executing a second machine learning component of the adaptive machine learning platform that is configured to generate the one or more sales milestones via input of sales data automatically retrieved from the online marketplace in connection with the product into the adaptive machine learning platform, each of the one or more sales milestones designating a total sales threshold and a specific time within the time period, wherein a sales milestone is achieved when total sales of the product reach the total sales threshold at the specific time; and determining automatically whether to discontinue one or more of the advertising campaigns or modify one or more of the advertising campaigns by decreasing the corresponding one or more bid values, while allowing the sales goal to be reached, the determination being based on at least one of the organic sales forecast or the sales milestones being achieved.

11. The system of claim 10, wherein the sales goal is based at least in part on one or more inventory constraints.

12. The system of claim 10, wherein the sales data is collected from one or more sales channels.

13. The system of claim 10, wherein the sales data is repeatedly collected at a set time interval.

14. The system of claim 10, wherein the advertising campaign is an automated advertising campaign or a keyword advertising campaign.

15. The system of claim 10, further comprising an additional operation of modifying a sales price of the product on the online marketplace.

16. The system of claim 15, further comprising additional operations of:

executing a third machine learning component of an adaptive machine learning platform to generate a third machine learning component output, at least in part based on the sales data;

generating, based at least in part on the third machine learning component output of the third machine learning component, a sales price adjustment for the product; and adjusting, based at least in part on the sales price adjustment and a status of the sales goal, the sales price of the product on the online marketplace.

17. The system of claim 10, wherein the adaptive machine learning platform is additionally inputted with additional marketplace data automatically retrieved from the online marketplace in connection with the product to generate the organic sales forecast.

18. The system of claim 17, wherein the additional marketplace data includes one or more of a marketplace ranking of the online marketplace seller for the product, a plurality of customer reviews of the online marketplace seller for the product, a rating of the online marketplace seller for the product based on the customer reviews, a number of total sales, a number of organic sales, a number of advertisement-generated sales, a conversion rate, a number of advertisement clicks relating to the advertising campaign, and a number of advertisement impressions relating to the advertising campaign.

* * * * *